United States Patent
Fritz

(10) Patent No.: US 6,591,053 B2
(45) Date of Patent: Jul. 8, 2003

(54) FIBER OPTIC WALL MOUNT CABINET

(75) Inventor: Robert L. Fritz, Elwood, IL (US)

(73) Assignee: Panduit Corp., Tinley Park, IL (US)

( * ) Notice: Subject to any disclaimer, the term of this patent is extended or adjusted under 35 U.S.C. 154(b) by 85 days.

(21) Appl. No.: 09/801,299

(22) Filed: Mar. 7, 2001

(65) Prior Publication Data

US 2001/0036351 A1 Nov. 1, 2001

Related U.S. Application Data

(60) Provisional application No. 60/187,853, filed on Mar. 8, 2000.

(51) Int. Cl.[7] .................................................. G02B 6/00
(52) U.S. Cl. ...................................................... 385/135
(58) Field of Search ................................ 385/135, 136, 385/137

(56) References Cited

U.S. PATENT DOCUMENTS

| 4,708,430 | A | * | 11/1987 | Donaldson et al. | 385/134 |
|---|---|---|---|---|---|
| 4,898,448 | A | * | 2/1990 | Cooper | 385/135 |
| 5,109,467 | A | * | 4/1992 | Hogan et al. | 385/135 |
| 5,119,459 | A | | 6/1992 | Meyerhoefer et al. | |
| 5,142,607 | A | * | 8/1992 | Petrotta et al. | 385/135 |
| 5,167,001 | A | | 11/1992 | Debortoli et al. | |
| 5,370,553 | A | | 12/1994 | Zimmerman | |
| 5,408,570 | A | | 4/1995 | Cook et al. | |
| 5,497,444 | A | | 3/1996 | Wheeler | |
| 5,546,495 | A | | 8/1996 | Bruckner et al. | |
| 5,640,482 | A | | 6/1997 | Barry et al. | |
| 5,661,840 | A | | 8/1997 | Caveney | |
| 5,778,130 | A | | 7/1998 | Walters et al. | |
| 5,933,563 | A | * | 8/1999 | Schaffer et al. | 174/58 |
| 6,201,920 | B1 | * | 3/2001 | Noble et al. | 385/134 |
| 6,385,381 | B1 | * | 5/2002 | Janus et al. | 385/135 |
| 6,396,990 | B1 | * | 5/2002 | Ehn et al. | 174/50.51 |

* cited by examiner

Primary Examiner—Tulsidas Patel
Assistant Examiner—Thanh-Tam Le
(74) Attorney, Agent, or Firm—Robert A. McCann; Jay A. Saltzman; Christopher S. Clancy

(57) ABSTRACT

A fiber optic wall mount cabinet includes a heavy gauge metal enclosure having a back wall, top and bottom walls, side walls, and covers. A patch panel wall disposed substantially parallel to a side wall and extending between the top and bottom wall separates the interior of the cabinet into an incoming chamber and exiting chamber. Both sides of the patch panel wall include a plurality of attachment sites to which a connector mounting plate or bend radius control clip may be releasably secured. The bend radius control clip may comprise a bend radius control arm adapted to prevent bending of fiber optic cables terminated on the patch panel wall. The cabinet further comprises a first cover hingedly connected to the side wall and a second cover hingedly connected to the back wall. In a closed position, both the first cover and second cover completely enclose the incoming chamber and exiting chamber, respectively.

12 Claims, 4 Drawing Sheets

FIBER OPTIC WALL MOUNT CABINET

Applicant claims, under 35 U.S.C. § 119(e), the benefit of priority of the filing date of Mar. 8, 2000, of U.S. Provisional Patent Application Ser. No. 60/187,853, filed on the aforementioned date, the entire contents of which are incorporated herein by reference.

FIELD OF THE INVENTION

The present invention relates substantially to fiber optic wall mount cabinets and more particularly to a fiber optic wall mount cabinet having improved modular bend radius control for fiber optic cables.

BACKGROUND OF THE INVENTION

Fiber optic wall mount cabinets are generally used inside telecommunication closets to facilitate interconnection of plant cable to active equipment such as servers, hubs and routers. Wall mount fiber optic cabinets generally have smaller space requirements than associated rack-mounted systems which require floor space to accommodate the rack standing on the floor.

Fiber optic wall mount cabinets provide for interconnection of fiber optic cables through use of a patch panel. A patch panel comprises interconnected pluralities of fiber optic connectors. The patch panel may have a first plurality of fiber optic connectors where fiber optic cable entering the cabinet may be terminated and a second plurality of fiber optic connectors where fiber optic cable exiting the cabinet may be terminated. The patch panel may interconnect the incoming fiber optic cable to the exiting fiber optic cable. The patch panel enables technicians to make secure connections and detachments of fiber optic cables in the field without disturbing other connections.

The fiber optic wall mount cabinet also provides for storage of slack cable. As fiber optic cables with attached fiber optic connectors are manufactured in predetermined lengths, a certain amount of slack cable may result from connecting the fiber optic cables to the patch panel. Such slack cable ideally should be contained within a limited amount of space, preferably as close to a termination point as possible. A fiber optic wall mount cabinet may utilize slack spools and/or splice trays for fiber optic cable slack management. Slack spools are cylindrical formations of a minimum diameter where excess fiber optic cable may be wound without bending the cable beyond a minimum bend radius where the fiber optic cable may be damaged. Slack trays hold and protect excess fiber optic cable associated with a splice, i.e., a permanent attachment of pairs of fiber ends. Both devices organize excess slack of interconnected fiber optic cable.

As with all uses of fiber optic cable, providing complete protection of interconnected fiber optic cables and maintaining bend radius control is very important to maintaining quality transmission of data. Thus, providing immediate bend radius control to the fiber optic cables being terminated is a significant concern of installers. Also of significance to field installers is the ability to better position and manipulate the bend radius control devices in a modular environment. A properly designed fiber optic wall mount cabinet may hold interconnected fiber optic cables so that it may be both routed within the cabinet and isolated from disturbance. In view of these considerations, improvements in fiber optic wall mount cabinets are desired.

SUMMARY OF THE INVENTION

According to an exemplary embodiment of the present invention, a fiber optic wall mount cabinet may consist of a side wall, a top wall, a bottom wall, and a back wall forming a substantially rectangular enclosure. A patch panel wall may be located within the cabinet so as to define an incoming chamber and an outgoing chamber. The incoming chamber may further define an incoming surface of the patch panel wall. Similarly, the outgoing chamber may further define an outgoing surface of the patch panel wall. Each surface may also comprise a plurality of attachment sites. The attachment sites may be adapted to receive a connector mounting panel or a bend radius control clip. The cabinet may also have at least one cable access slot adapted for passing fiber optic cables that terminates in the incoming chamber. Likewise, the cabinet may have at least one cable access slot adapted for passing fiber optic cable that terminates in the exiting chamber.

The attachment sites may enable the connector mounting plate or bend radius control clip to be releasably secured to the patch panel wall. The connector mounting plate may enable mounting of at least one fiber optic cable connector on each surface of the patch panel so as to terminate fiber optic cable. The bend radius control clip includes a bend radius control arm that permits control of fiber optic cable bending as it passes over the bend radius control clip. Depending on the entry of the fiber optic cable into the incoming chamber or exiting chamber, the bend radius control clip may be oriented upwards or downwards so as to allow the control arm to receive and guide the fiber optic cable as it is terminated on the at least one fiber optic connector.

In a preferred embodiment, the fiber optic wall mount cabinet may have two covers. A first cover may be attached to the side wall and moveable between a closed position to cover the incoming chamber and an open position to allow access to the incoming chamber. The second cover may be attached to the back wall and moveable between a closed position to cover the exiting chamber and an open position to allow access to the exiting chamber. The cabinet may also have at least one slack management spool secured to the back wall to support the fiber optic cable as it enters the incoming chamber. The at least one slack management spool may have a radius exceeding a minimum bend radius of fiber optic cable so that spooled fiber optic cable may not be damaged. In addition, the at least one slack management spool may have at least one attachment point for a bundling strap. The bundling strap may be used to retain slack optical fiber.

These and other features and advantages of the invention will be apparent to those skilled in the art upon review of the following detailed description of preferred embodiments and drawings.

BRIEF DESCRIPTION OF THE DRAWINGS

Exemplary embodiments of the present invention are described herein with reference to the following figures.

DETAILED DESCRIPTION OF THE DRAWINGS AND PREFERRED EMBODIMENTS

Figure 1:
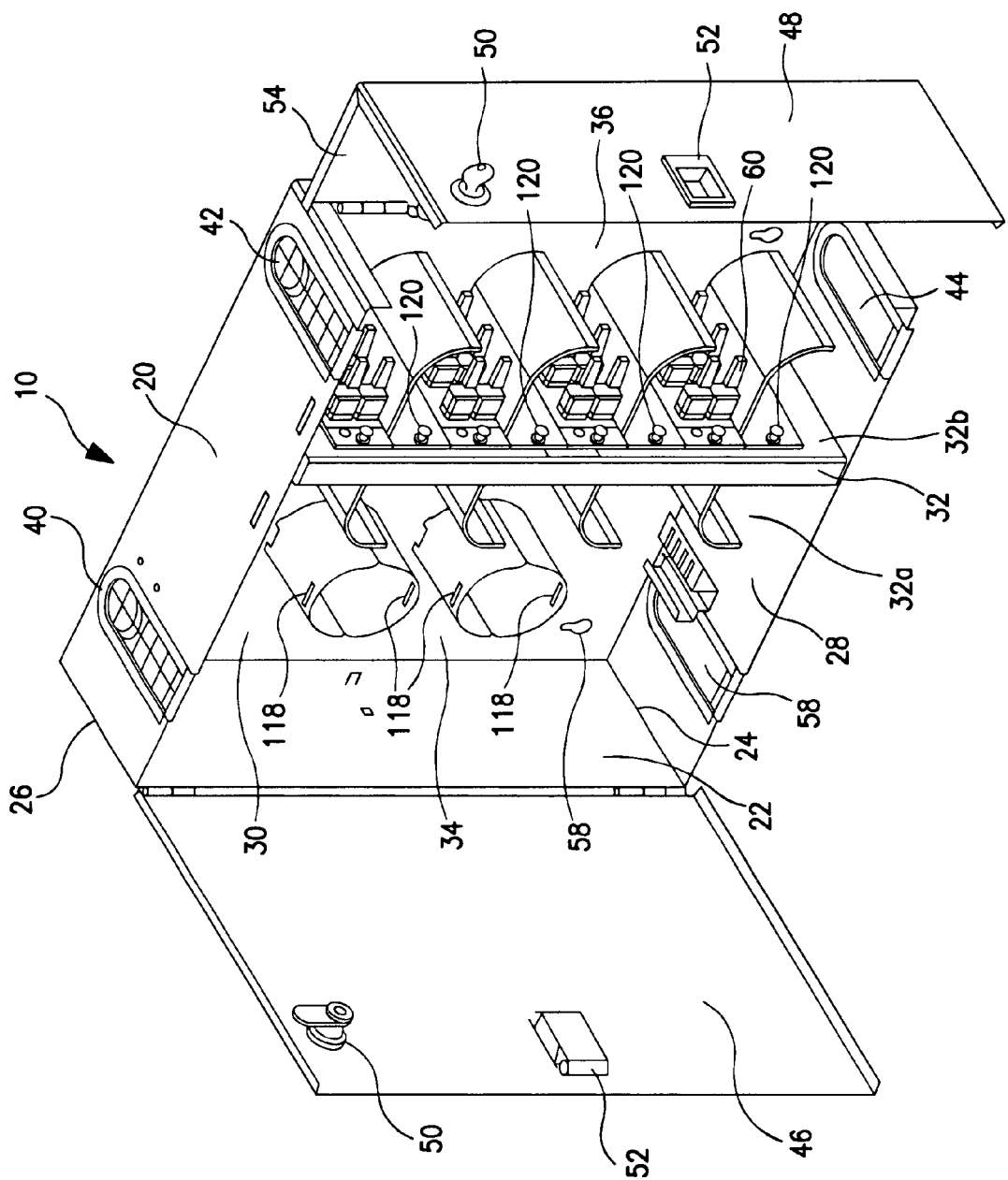
FIG. 1 is a top front perspective view of an open fiber optic wall mount cabinet.

FIG. 1 illustrates a preferred embodiment of the present invention, wherein an exemplary fiber optic wall mount cabinet 10 comprises a side wall 22 connected at a first end 24 to a bottom wall 28 and at a second end 26 to a top wall 20. In a preferred embodiment, a back wall 30 may be substantially perpendicular to edges of the top wall 20, the side wall 22, and the bottom wall 28 so that the side wall, bottom wall, top wall, and back wall (each constructed of heavy gauge metal) forms a substantially rectangular enclosure. The back wall 30 not only provides a back surface to the cabinet 10 but the back wall 30 may also comprise key hole mounting slots 58. The key hole mounting slot 58, located preferably at or near the four corners of the back wall 30, may allow for mounting of the cabinet 10 over previously located screws, bolts, or the like. Thus, the cabinet 10 need not be held in place while trying to start, for example, mounting screws. Other arrangements are also possible.

A patch panel wall 32 located within the cabinet 10 may hold fiber optic connectors 60 for connecting fiber optic cable (not shown). In an exemplary embodiment, the patch panel wall 32 may extend between the top wall 20 and the bottom wall 28 and substantially parallel to the side wall 22. The patch panel wall 32 divides the interior of the cabinet 10 into an incoming chamber 34 and an exiting chamber 36, thereby creating two surfaces, a first incoming surface 32a and a second exiting surface 32b. The cabinet 10 may have at least one slot 40 in the top wall 20 and/or at least one slot 38 in the bottom wall 28 of the incoming chamber 34 and, likewise, at least one slot 42 in the top wall 20 and/or at least one slot 44 in the bottom wall 28 of the exiting chamber 36. The slots may be located to route fiber optic cable into the incoming chamber 34 and exiting chamber 36. Incoming fiber optic cable from cable plant may enter the incoming chamber 34 through slot 38 and/or slot 40, and be terminated on the incoming surface 32a. In a like manner, fiber optic cable terminated on exiting surface 32b may be routed out of the cabinet 10 through slot 42 and/or 44 to active equipment, such as a server. Other arrangements are also possible including other orientations of the patch panel wall 32, for example.

In an exemplary embodiment, the incoming chamber 34 is illustrated as on the left side of the cabinet 10 and the exiting chamber 36 is illustrated as on the right side of the cabinet 10. Of course, the cabinet 10 may be configured as a mirror reflection of that illustrated without limitation (i.e., incoming chamber on right of cabinet 10 and exiting chamber on left of cabinet 10). Additionally, while the exemplary embodiment is shown with the patch panel wall 32 disposed vertically within the cabinet 10, dividing the cabinet 10 asymmetrically, the patch panel 32 may be located in any convenient position and orientation.

The exemplary embodiment of the fiber optic wall mount cabinet 10 may also include a first cover 46 and a second cover 48 to cover the incoming chamber 34 and exiting chamber 36, respectively. The first cover 46 may be hingedly connected to the side wall 22 such that the first cover 46 is perpendicular to the side wall 22 and substantially closes the incoming chamber 34. The second cover 48 may be hingedly connected to the back wall 30, to form a second side wall 54 opposite to the side wall 22, when closed, and an exiting front wall 56 level with a closed first cover 46, when closed. When fully open, the second cover 48 enables full access to the exiting chamber 36 from both the front and side of the cabinet 10. The first cover 46 and second cover 48 may also include latches 50 and handles 52, located preferably on the outer edges of each cover, for providing security and accessibility, respectively, to the respective chambers 34, 36. In an alternative embodiment, each cover may be hingeless, completely removable, and releasably secured to the cabinet 10 with snaps, clips, or the like. Other arrangements are also possible. For example, the first cover and second cover may be connected to walls of the cabinet 10 other than those illustrated in FIG. 1.

Figure 2:
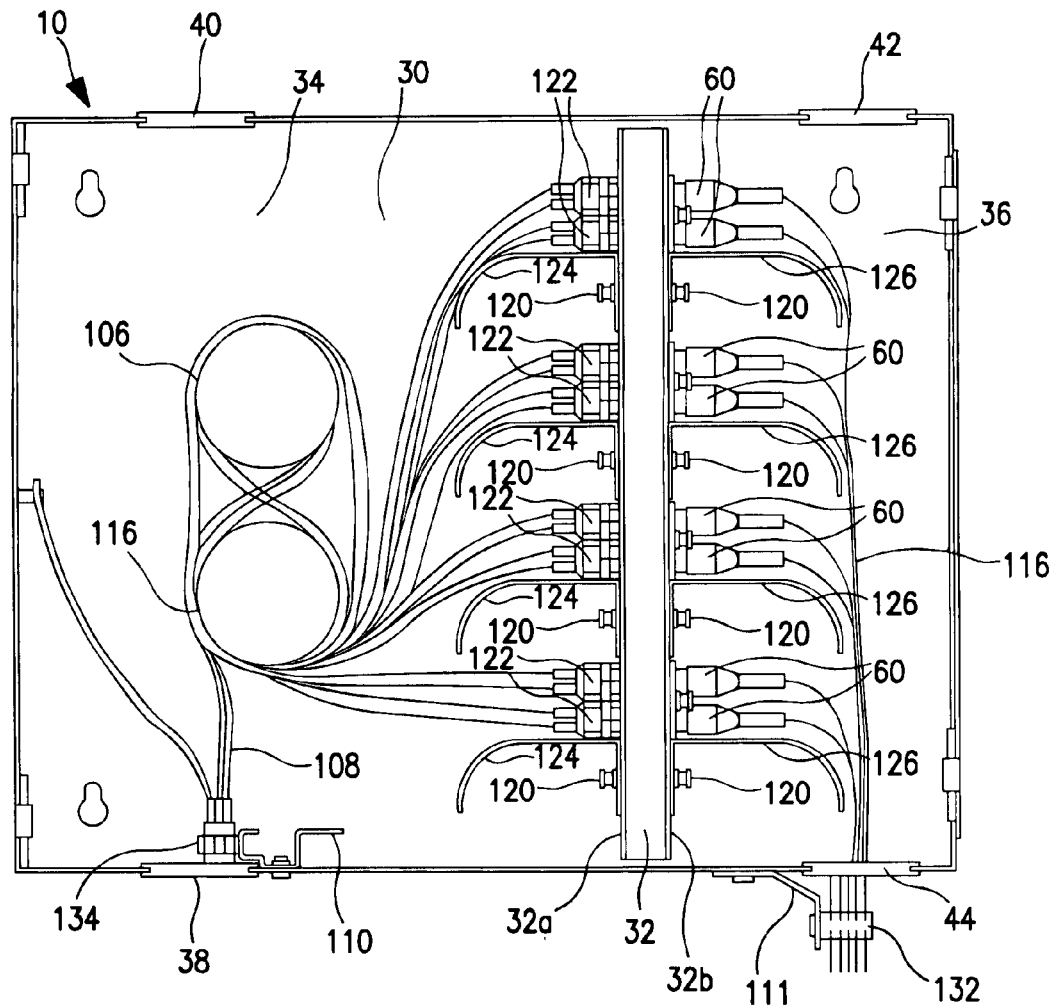
FIG. 2 is a front sectional view of a fiber optic wall mount cabinet shown through a closed front wall.

FIG. 2 depicts a detailed view of the patch panel wall 32 as it separates the cabinet 10 into the incoming chamber 34 and the exiting chamber 36. The first cover 46 (FIG. 1) and second cover 48 (FIG. 1) are removed for clarity. The patch panel wall 32 provides for a plurality of attachment sites 120 adapted to receive bend radius control clips 122, 60 for controlling bending of fiber optic cable 108, 116 and connector mounting plates (not shown) for mounting fiber optic connectors 122, 60. The plurality of attachment sites 120 may comprise at least one aperture on the patch panel wall 32. The bend radius control clips 124, 126 and connector mounting plates may be releasably secured to both the incoming surface 32a and the exiting surface 32b at the plurality of attachment sites 120 using releasable snap rivets, bolts, screws, or other similar mounting devices.

Figure 3:
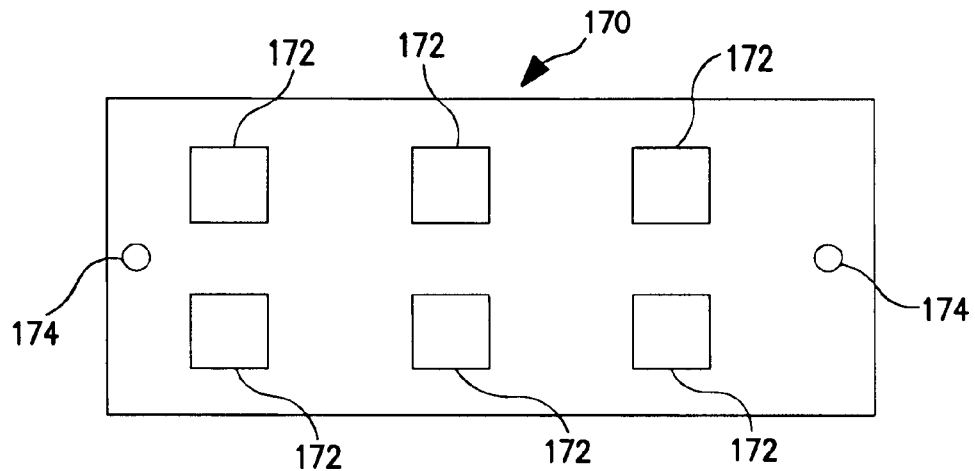
FIG. 3 is a front sectional view of a connector mounting plate.

The fiber optic connectors 122, 60 may serve as termination points for incoming fiber optic cable 108 and the exiting fiber optic cable 116. The fiber optic connectors 122, 60 may be arranged in any convenient orientation on the patch panel wall 32 depending on desired connector density. The incoming surface 32a and exiting surface 32b of the patch panel wall 32 may be configured to accept direct mounting of fiber optic connectors 122, 60 at the plurality of attachment sites 120 or, as noted above, connector mounting plates may be used to mount the fiber optic connectors onto the patch panel wall 32. If directly mounted, the fiber optic connectors 122 may be inserted into apertures on the patch panel wall 32. If mounted via a connector mounting plate, the fiber optic connectors 122, 60 may be inserted into apertures of the connector mounting plate and the connector mounting plate may be mounted onto the patch panel wall 32. FIG. 3 illustrates an exemplary embodiment of a connector mounting plate 170. The connector mounting plate 170 may comprise at least one aperture 172 shaped to accept a fiber optic connector 122. The connector mounting plate 170 may also have at least one aperture 174 for releasably securing the connector mounting plate 170 (with the fiber optic connector 122, 60) at the plurality of attachment sites 120 on the patch panel wall 32.

Of course, regardless of the mounting technique (direct mounting or via connector mounting plate), the exemplary embodiment is not limited in the spatial relationship or quantity of fiber optic connectors 122, 60 mounted on the patch panel wall 32.

A function of the patch panel wall 32 (FIG. 2) may be to interconnect the fiber optic connectors 122 in the incoming chamber 34 with the fiber optic connectors 60 in the outgoing chamber 36. The fiber optic connectors 122 in the incoming chamber 32 may be "patched" to the fiber optic connectors 60 in the outgoing chamber 102 by an internal fiber optic cable (not shown) connecting respective fiber optic connectors. Thus, an incoming fiber optic cable 108 (e.g. from outside cable plant) terminated on a fiber optic connector 122 on the incoming surface 32a of the patch panel wall 32 may be connected to an exiting fiber optic cable 116 (e.g. to a server) terminated on a fiber optic connector 60 on the exiting surface 32b of the patch panel wall 32. Other arrangements are also possible.

The use of fiber optic connectors 122, 60 on the patch panel wall 32 allows for simplified detachment and reattachment of fiber optic cables. For instance, if a server is to be connected to another cable, only a connection change is required. At the fiber optic connector 122 of the incoming surface 32a, the fiber optic cable connecting the first cable may be replaced with the fiber optic cable connecting the second cable. Unlike splicing which is a permanent connection, the use of fiber optic cables with connectors, along with the fiber optic connectors of the patch panel wall, simplifies the process of making connection changes.

The position of the patch panel wall 32 with respect to the incoming fiber optic cable 108 and the exiting fiber optic cable 116 facilitates connection of respective fiber optic cable to the fiber optic connectors 122, 60 while minimizing the risk of bending beyond the minimum bend radius of fiber optic cables. The positioning of the patch panel wall 32 within the cabinet 10, being parallel to side wall 22 (FIG. 1) and between incoming slots 38, 40 and exiting slots 42, 44 is characteristic of the exemplary embodiment of the present invention. Although, as discussed above, alternative orientations are also possible.

Figure 4:
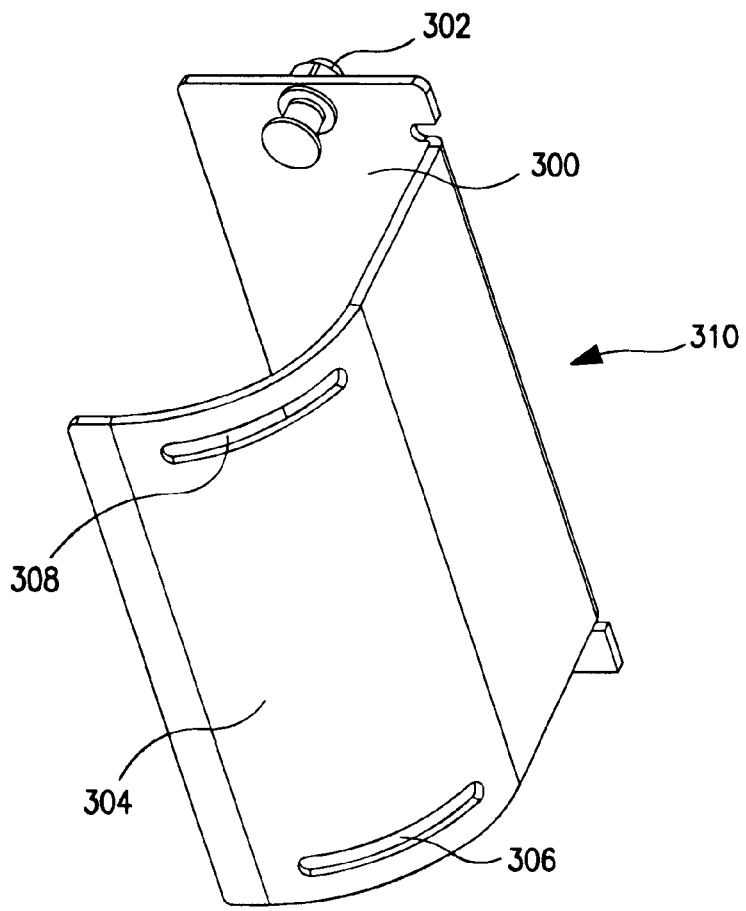
FIG. 4 is a perspective view of a bend radius control clip.

FIG. 4 illustrates an exemplary embodiment of a bend radius control clip 310. The bend radius control clip 310 may comprise an adapter plate surface 300, including releasable attaching means 302 for securing the clip 310 on the patch panel wall 32 (FIGS. 1 & 2). The attaching means 302, e.g., releasable snap rivets, may be inserted into the plurality of attachment sites 120 of the patch panel wall 32. The bend radius control clip also comprises a bend radius control arm 304. The bend radius control arm 304 extends substantially perpendicularly from one side of the adapter plate surface 300 and terminates in a curvilinear radius control portion. The bend radius control arm 304 functions to create a gradual directional transition in the fiber optic cable, as for example, when a cable traversing a system in a horizontal direction is routed vertically. The radius is adapted to prevent bending beyond the minimum bend radius, as established, for example, by industry standard for a given cable. If desired, the bend radius control arm 304 may be equipped with attachment points (e.g., pair of slots 306, 308) through which bundling straps may be threaded.

Figure 5:
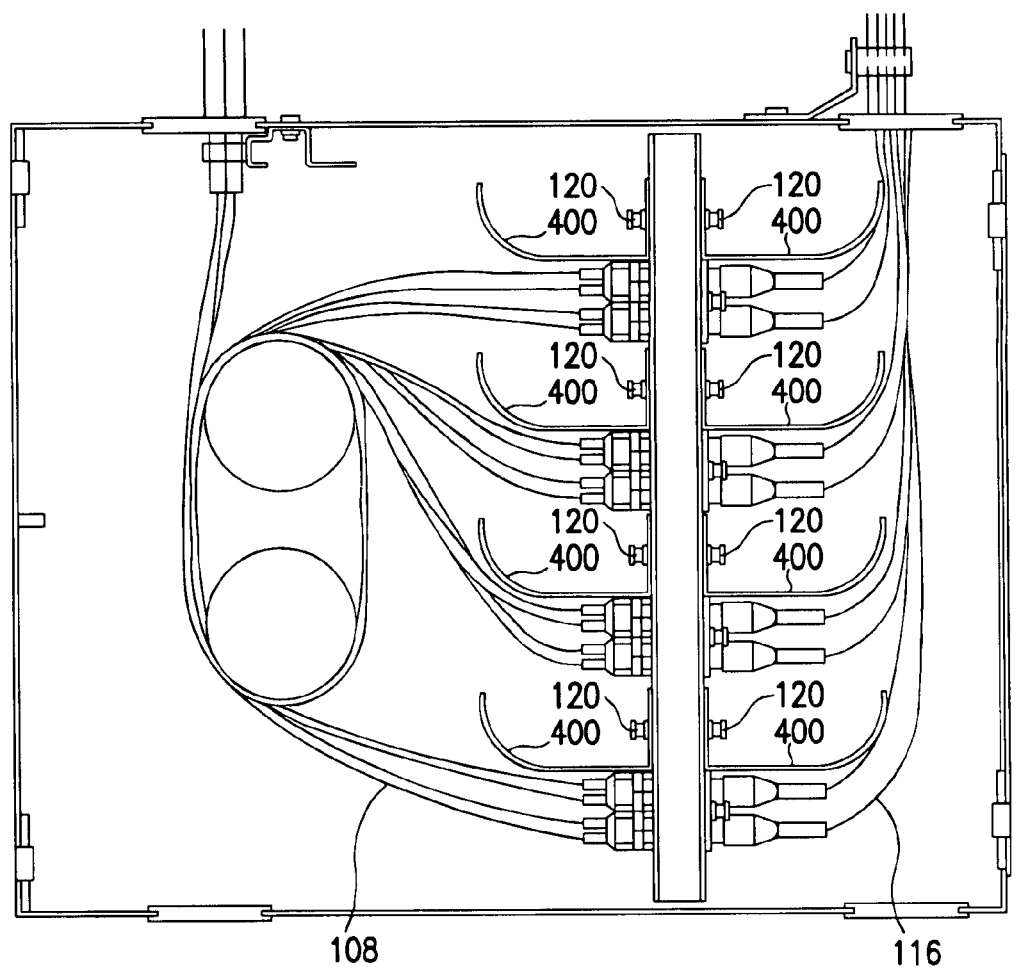
FIG. 5 is a front sectional view of a fiber optic wall mount cabinet, shown with bend radius control clips mounted in an opposite direction to that shown in FIG. 2.

The configuration of the bend radius control clip 310 allows for positioning the bend radius control arm 304 immediately adjacent to fiber optic connectors on the patch panel wall. The bend radius control arm 304 of the bend radius control clip 310 is configured so as to provide a bend radius control surface at a position where the terminated fiber optic cable exits a connector 122, 60 that is mounted on the patch panel wall 32. The bend radius control clip 310 provides for complete control of fiber optic cable bending at this important location. The bend radius control clip 310 may be oriented downwardly as in FIG. 2 or upwardly as in FIG. 5, depending on whether the incoming or exiting fiber optic cables enter from the slots 40, 42 in the top wall 20 or the slots 42, 44 in the bottom wall 28. Additionally, the bend radius control clips 124, 126 may be eliminated to increase the density of the fiber optic connectors 122, 60 supported by the patch panel wall 32.

Referring to FIG. 2, the incoming chamber 34 may also include a pair of slack management spools 106, 116 which allow for spooling bulk incoming fiber 108 while maintaining a minimum bend radius. The slack management spools 106, 116 may be secured, releasably or permanently, to the back wall 30. In the exemplary embodiment, the slack management spools 106, 116 are round and cylindrical. The slack-spools management spools 106, 116 may have a cylindrical shaft with a curved surface for supporting the fiber optic cable 108. It may also comprise an end-flange (not shown) for preventing the fiber optic cable from slipping off the spools. Other configurations are also possible. For example, the slack spools 106, 116 may be shaped in a half-cylinder. A half-cylinder shape may reduce space requirements. Alternatively, the cabinet may have a quantity of slack spools other than two.

The slack management spools 106, 116 may have a radius of at least 1.5 inches to impart bend radius control. The defined radius may prevent excessive bending of loops of slack cable passing over the spool 106, 116. Radii greater than the minimum bend radius may also be used without impairing the functionality of the spools.

The use of two round slack spools 106, 116 in particular, enables routing of incoming fiber optic cable 108 in an oval, circular, or figure eight arrangement without concern for excessive bending. The round slack spools 106, 116 may also have attachment points 118 (FIG. 1) for bundling straps. Bundling straps may be fed through the attachment points 118 (e.g., slots) to retain the slack fiber optic cable in place. Furthermore, the cabinet 10 may have strain relief brackets 110, 111 fastened adjacent to the slots 38, 40, 42, 44. The strain relief brackets 110, 111 may anchor ties 130, 132 to the cabinet for bundling the fiber optical cable 108, 116 that enters and exits each chamber. Other arrangements are also possible for securing fiber optic cable.

Preferred embodiments of the present invention have been described herein. It is to be understood that modifications and changes can be made without departing from the true scope and spirit of the invention, as defined by the following claims which are to be interpreted and understood in view of the foregoing.

I claim:

1. A fiber optic wall mount cabinet comprising:
   a substantially rectangular enclosure having a side wall, top wall, bottom wall, and back wall;
   a patch panel wall located within the enclosure, defining an incoming chamber and an exiting chamber of the cabinet, the patch panel wall comprising an incoming surface and an exiting surface, the incoming surface and exiting surface each comprising a plurality of attachment sites adapted to receive a connector mounting plate or a bend radius control clip; and
   at least one connector mounting plate releasably secured to the patch panel wall; and at least one bend radius control clip releasably secured to at least one of the plurality of attachment sites.

2. The fiber optic wall mount cabinet of claim 1 wherein the at least one bend radius control clip comprises a bend radius control arm adapted to control bending of a fiber optic cable passing over the bend radius control clip.

3. The fiber optic wall mount cabinet of claim 2, wherein the bend radius control clip can be to one of said plurality of attachment sites in either an securer upward or downward orientation.

4. The fiber optic wall mount cabinet of claim 2, wherein the bend radius control arm is configured so as to provide a bend radius control surface at a position where a terminated fiber optic cable exits a connector that has been mounted on the at least one connector mounting plate.

5. The fiber optic wall mount cabinet of claim 1, further comprising at least one cable access slot adapted for passage of a first fiber optic cable terminating in the incoming chamber and at least one cable access slot adapted for passage of a second fiber optic cable terminating in the exiting chamber, wherein the at least one connector mounting plate comprises at least one fiber optic connector for terminating the first fiber optic cable or second fiber optic cable at the patch panel wall.

6. The fiber optic wall mount cabinet of claim 1 further comprising a first cover attached to the side wall, the first cover being moveable between a closed position to cover the incoming chamber and an open position to access the incoming chamber and a second cover attached to the back wall, the second cover being moveable between a closed position to cover the exiting chamber and an open position to access the exiting chamber.

7. The fiber optic wall mount cabinet of claim 6, wherein the first and second covers are hingedly attached to the side wall.

8. A fiber optic wall mount cabinet comprising:
    a substantially rectangular enclosure having a side wall, top wall, bottom wall and back wall;
    a patch panel wall locate within the enclosure, defining an incoming chamber and an exiting chamber of the cabin, the patch panel comprising an incoming surface and an exiting surface, the incoming su ace and exiting surface each comprising a plurality of attachment sites adapted to receive a connector mounting plate or a bend radius control clip;
    at least one cable access slot adapted for passage of a first fiber optic cable terminating in the incoming chamber and at least one cable access slot adapted for passage of a second fiber optic cable terminating in the exiting chamber; and
    at least one connector mounting plate releasably secured to the patch panel wall; and at least one bend radius control clip releasably secured to at least one of the plurality of attachment sites.

9. The fiber optic wall mount cabinet of claim 8, wherein the at least one connector mounting plate comprises at least one fiber optic connector for terminating the first fiber optic cable or second fiber optic cable at the patch panel wall.

10. The fiber optic wall mount cabinet of claim 8 wherein the at least one bend radius control clip comprises a bend radius control arm adapted to control bending of a fiber optic cable passing over the bend radius control clip.

11. The fiber optic wall mount cabinet of claim 10, wherein the bend radius control clip can be to one of said plurality of attachment sites in either an upward or downward orientation.

12. The fiber optic wall mount cabinet of claim 10, wherein the bend radius control arm is configured so as to provide a bend radius control surface at a position where a terminated fiber optic cable exits a connector that has been mounted on the at least one connector mounting plate.

* * * * *

UNITED STATES PATENT AND TRADEMARK OFFICE
CERTIFICATE OF CORRECTION

PATENT NO.   : 6,591,053 B1
DATED        : July 8, 2003
INVENTOR(S)  : Robert L. Fritz It is certified that error appears in the above-identified patent and that said Letters Patent is hereby corrected as shown below:

Column 6,
Line 55, the word "secured" is missing after "be".
Line 56, "securer" should not be in there.

Column 7,
Line 19, "locate" should be -- located --.
Line 22, "suace" should be -- surface --.

Column 8,
Line 18, the word "secured" is missing after "be".

Signed and Sealed this

Twenty-first Day of October, 2003

JAMES E. ROGAN
*Director of the United States Patent and Trademark Office*